United States Patent [19]
Rueff et al.

[11] 3,797,229
[45] Mar. 19, 1974

[54] CONNECTOR HOOK

[75] Inventors: Robert C. Rueff; Herschel E. Woltzen, both of St. Louis County, Mo.

[73] Assignee: Nixdorff-Krein Mfg., St. Louis, Mo.

[22] Filed: Sept. 25, 1972

[21] Appl. No.: 291,568

[52] U.S. Cl. ................................ 59/93, 294/82 R
[51] Int. Cl. ........................................ F16g 17/00
[58] Field of Search ............ 59/93, 86, 85, 78; 294/82 R, 78 R, 74, 75; 24/116 R

[56] References Cited
UNITED STATES PATENTS

| | | | |
|---|---|---|---|
| 320,047 | 6/1885 | Chambard | 294/82 R |
| 812,861 | 2/1906 | Martin | 294/82 R |
| 1,157,917 | 10/1915 | Allen | 24/116 R |
| 3,480,319 | 11/1969 | Raschke | 294/82 R |
| 3,575,458 | 4/1971 | Crook | 294/82 R |

FOREIGN PATENTS OR APPLICATIONS

| | | | |
|---|---|---|---|
| 1,068,196 | 2/1954 | France | 294/82 |
| 589,500 | 6/1947 | Great Britain | 294/82 |

*Primary Examiner*—Charles W. Lanham
*Assistant Examiner*—Gene P. Crosby
*Attorney, Agent, or Firm*—Ralph W. Kalish

[57] ABSTRACT

A connector link for engagement with separate chains or selected links of the same chain, having a pair of parallel legs with an intervening opening; the same being closed at one end by means of a bight portion extending between the adjacent ends of the legs and being normally open at its other end to permit engagement with a chain link. Provided for extension across the opening is a keeper link, embracing each of the legs for restraining the same against parting under applied forces.

10 Claims, 15 Drawing Figures

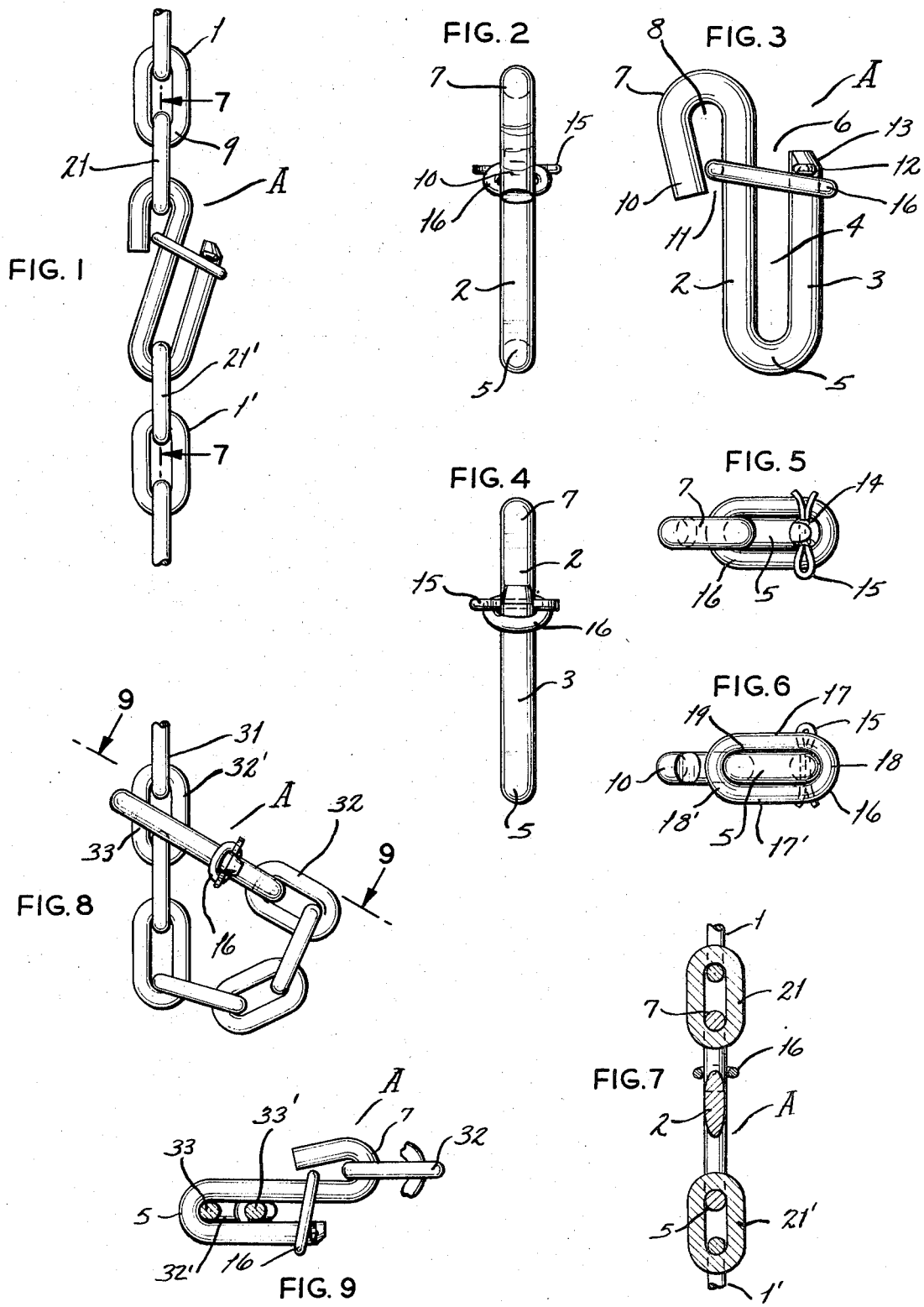

PATENTED MAR 19 1974 3,797,229

CONNECTOR HOOK

BACKGROUND AND SUMMARY OF THE INVENTION

The present invention relates in general to chains and, more particularly, to a connector hook for reliably and effectively connecting different chain lengths or preselected links of the same chain.

It is an object of the present invention to provide a connector link for chains having means for engaging opposed portions of the hook for causing same to resist a mutual spreading or parting under applied pull forces.

Another object of the present invention is to provide a connector hook of the type stated which incorporates a unique keeper link, embracing opposed portions of the hook for both preventing displacement therebetween of an engaged chain link, as well as to increasingly urge same against parting under forces developed upon the engaged chain during usage.

It is a further object of the present invention to provide a connector link of the character stated incorporating a unique keeper link which is more economically manufactured, being amenable to high volume production; and which may be readily adapted for utilization with existing hook configurations; and which is reliable and effective in usage.

It is a still further object of the present invention to provide a connector hook of the character stated which, by selection, may be adapted for maintenance of the associated keeper link against displacement; and which may be designed for embodying at least a pair of keeper links to resist forces applied in opposite directions.

It is another object of the present invention to provide a connector hook of the character stated which may be readily produced for use with chain links of myriad sizes and dimensions, and the engagement and disengagement of which may be achieved in a facile manner by the average unskilled individual without resort to use of tools or the like.

BRIEF DESCRIPTION OF THE DRAWINGS

FIG. 1 is a perspective view of chain lengths connected by a connector hook constructed in accordance with and embodying the present invention.

FIG. 2 is a side elevational view of the hook as viewed from the left hand side of FIG. 3.

FIG. 3 is a front view.

FIG. 4 is a side elevational view taken from the right side of FIG. 3.

FIG. 5 is a top plan view.

FIG. 6 is a bottom plan view.

FIG. 7 is a vertical transverse sectional view taken on the line 7—7 of FIG. 1.

FIG. 8 is a perspective view of a length of chain having a portion thereof connected by the connector hook; the form of engagement being distinct from that illustrated in FIG. 1.

FIG. 9 is a view in partial section taken on the line 9—9 of FIG. 8.

DESCRIPTION OF THE PRACTICAL EMBODIMENTS

Figure 10:
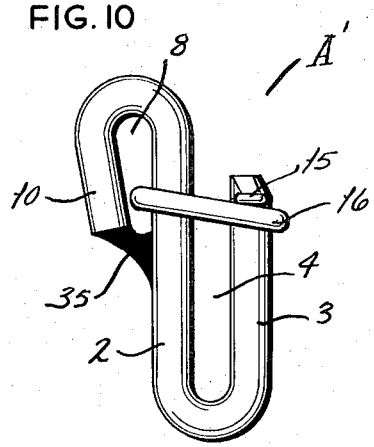
FIG. 10 is a front view of another form of connector hook constructed in accordance with and embodying the present invention.
Figure 11:
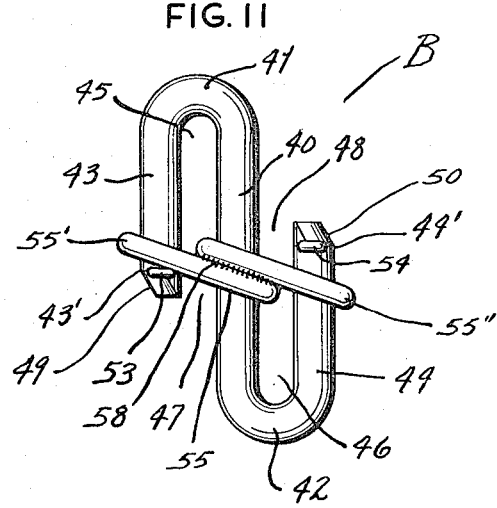
FIG. 11 is a further form of connector hook constructed in accordance with and embodying the present invention.
Figure 12:
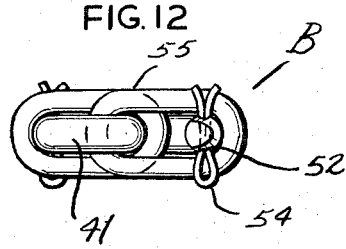
FIG. 12 is a top plan view of the hook illustrated in FIG. 11.
Figure 13:
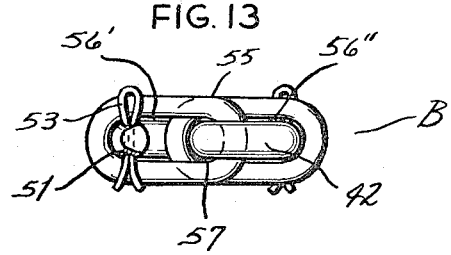
FIG. 13 is a bottom plan view.
Figure 14:
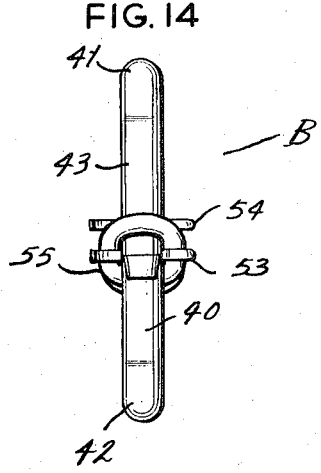
FIG. 14 is a side elevational view taken from the left hand side of FIG. 11.
Figure 15:
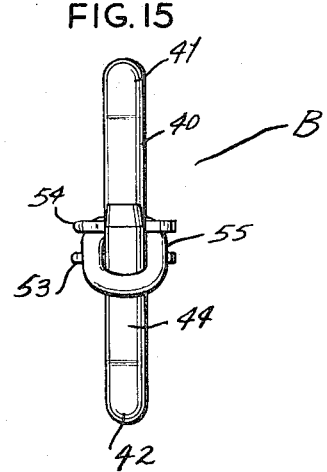
FIG. 15 is a side elevational view taken from the right hand side of FIG. 11.

Referring now by reference characters to the drawings which illustrate practical embodiments of the present invention, A designates a connector hook for use with lengths of chain, as indicated at 1,1', which are adapted for customary multi-purpose usage, such as, by way of example only, restraining chains for trailer bodies and the like, etc. As illustrated in FIG. 1 connector hook A is adapted for interengagement between two distinct chains, such as, 1,1', however, as will be developed hereinbelow said hook A is equally useful for engaging normally remote portions of a single chain.

Hook A is of general U-shape comprising normally parallel, inner and outer legs 2,3, respectively, with the former being relatively longer than the latter and with the development of a spacing 4 therebetween. Said legs 2,3 merge at one of their ends into an intervening curved bight portion 5 which defines one limit of spacing 4, which latter is open at its opposite end, as at 6. Inner leg 2, at its end remote from bight 5, is turned upon itself, away from leg 3, as at 7, to develop an eyelet 8 for interconnection with a conventional chain link 9; the plane of said eyelet 8 is within the same plane as that of spacing 4. As shown in FIG. 3, the terminal or nose 10 of the turned portion 7 converges toward leg 2 to provide a throat 11 markedly reduced with respect to eyelet 8 so that a secured chain link would not be passable therebetween.

The end of outer leg 3 remote from bight 5 is free, as at 12, and terminates spacedly from the bight remote end of inner leg 2 and with it said free end being provided with a taper or bevel, as at 13, extending lengthwise of said leg 3. At the base of said bevel, leg 3 is apertured, as at 14, for accepting a cotter pin or like fastener 15 for purposes presently appearing; the axis of said aperture 14 being substantially normal to the longitudinal axis of leg 2.

Provided for cooperation with hook A is a keeper link 16 which is of the same general contour as a chain link, being of elongated character having parallel, spaced-apart side runs 17,17' connected at their ends by substantially semi-circular end portions 18,18' for defining a lengthwise opening 19. Keeper link 16 is so dimensioned that it may normally pass along legs 2,3 embracingly thereof with the area and configuration of opening 19 being great enough so that both legs 2,3 of hook A are unobstructingly concurrently acceptable therethrough. It is preferable that the area of opening 19 be substantially equivalent to the transverse sectional area developed through legs 2,3 and the contained portion of opening 4 so as to present a relatively close fit; with tapered end 13 facilitating movement of link 16 from, and onto, leg 3 as below described. Keeper link 16 is formed from rod stock of relatively reduced cross section, or diameter, with respect to that from which hook A is formed. Although admittedly dimensions are not critical, it has been found in practice that with the legs of hook A having a diameter of 17/32 of an inch, the stock from which keeper link 16 is formed may have a diameter of but 9/32, roughly one-half that of the components of hook A. The foregoing dimensions are set forth simply for illustration, demonstrating that link 16 is fully effective without being formed from like stock as hook A. It is, of course, understood that the diametral ratio may be reduced if desired. Furthermore, the cross-section of the stock of link 16 is less than the transverse extent of throat 11 so as to be freely movable therethrough. With the construction illustrated in FIGS. 1–9, inclusive, link 16 is a separate and distinct component; being engageable with hook A in a manner to be described for locking safety purposes.

With connector hook A engaged to a length of chain 1, as by a link thereof 21 being interconnected within eyelet 8, keeper link 16 is slipped over bight-end of connector hook A and passed along legs 2,3 with one end moving through throat 11 and with the other end being swung past free end 13 of outer leg 3 for clearing end 6 of opening 4 in order that a link 21' of chain length 1' may be suitably engaged upon bight 5. It will be seen that chain links 21,21' are interengaged in the usual fashion and are in substantially perpendicular relationship to the adjacent links of the respective chains 1,1'. With chain link 21' thus engaged upon bight 5, the keeper link is then returned for embracing leg 3, being moved beyond opening 14 in order that cotter pin 15 may be inserted therethrough. By such pin 15 keeper link 16 is effectively inhibited from displacement beyond free end 13 of leg 3. Engagement of keeper link 16 may not be lost in the other direction since chain link 21' provides a suitable barrier.

Therefore, in actual usage, keeper link 16 serves to prevent legs 2,3 of hook A from spreading or effecting a further parting through the pull force developed in chain 1'. It is well known that a straight or axial pull upon a chain will tend to cause the legs of a hook, as of the connector, grab, or slip-type, to be moved away from each other, thereby markedly increasing the transverse extent of the intervening opening 4 with the potential loss of engagement with the related chain, such as, in the present instance, through link 21' being easily moved relatively of leg 3 to disengaged, independent state with the expected attendant hazards in such a contingency.

By way of example only, it has been found that slip hooks formed from 17/32 alloy stock will start to open at a pull of about 8500 pounds, with grab hooks commencing to open at about 9000 pounds straight pull, ane with complete breaking of the hooks between 12,000 and 13,000 pounds. Thus, keeper link 16 serves to maintain legs 2,3 against parting, offering a substantial resistance so that straight pulls markedly greater than those heretofore accommodated by the selected material of construction will not bring about the undesired spreading and ultimate breakage. It is noteworthy that by virtue of the relationship of keeper link 16 to legs 2,3 the engagement therebetween will become progressively more snug as the pull develops in the associated chain. Accordingly, the applied force serves efficiently to correspondingly more tightly lock the link 16 into operative condition.

With the present invention the serviceability of standard types of connector links is increased substantially by the mere utilization of keeper links which is manifestly more economical than producing connector links of larger diameter stock or from most costly alloys or treated materials. Link 16 simultaneously serves as a locking or safety feature which renders normal grab or slip hooks into safety hooks without necessitating the application of pivoted safety latches as have been used to the present time.

Turning now to FIGS. 8 and 9, it will be seen that the present invention is equally effective when connector hook A is utilized with a single chain length, as indicated at 31 in FIG. 8, for the purpose of interengaging normally remote links 32,32' thereof. In this context, connector hook A serves as a grab hook with the selected link, as 32', being moved into spacing 4 with one of its side runs 33 abutting against bight 5 and with the other of its side runs 33' being located also within spacing 4 but toward the free end of leg 3. Keeper link 16 serves to prevent relative dislodgment of link 32' in the manner of a safety barrier.

FIGS. 1 and 8 demonstrate the versatility of hook A in being useful for interconnecting the links of different chains or the links of the same chain.

Referring now to FIG. 10, another form of connector hook, indicated A', is shown and with components of connector A above described bearing like reference numerals. It will thus be seen that connector hook A' is substantially identical to connector A but with the exception that eyelet 8 is completely enclosed as by a bridge 35 constituted of a weld extending between the terminal or nose 10 and the adjacent, confronting portion of inner leg 2. By virtue of said bridge 35, keeper link 16 is permanently disposed at one end within eyelet 8 so that dislodgment from hook A is denied. However, eyelet 8 is of sufficient extent to allow adequate maneuverability of keeper link 16 for permitting full ingress into, and egress from, opening 4 by a chain link.

Referring now to FIGS. 11–15, inclusive, a further form of connector hook, indicated B is shown which is characterized by its symmetry permitting of the same relationship with engaged chains extending in opposite directions. Hook B, being formed from a single length of rod stock, comprehends a central leg 40 which is bent at its opposite ends in opposite directions to form bight portions 41,42 which are such continuous with outer legs 43, 44 both being axially parallel to central leg 40 and each terminating in a free end, as at 43', 44' on opposite sides of the transverse center line of leg 40. Legs 43,44 may be of the same relative extent and the arcs of curvature of bight portions 41,42 are preferably the same so that hook B may be used with equal facility end for end. Between each outer leg 43,44 and central leg 40 is a spacing 45, 46, respectively, closed at one end by the associated bight portion 41,42, respectively, and communicating with the exterior through a mouth 47,48 between the free ends of legs 43,44 and central leg 40. The free ends 43',44' of legs 43,44 are both tapered, as at 49,50, in their outer portions inwardly toward central leg 40 and immediately adjacent such tapered portions each of said legs 43,44 is provided with an aperture 51,52 axially normal to the major axis of the related legs 43,44, respectively, for receiving a cotter pin 53,54.

It will thus be seen that connector hook B is entirely symmetrical about central leg 40 so that there is obviated any concern for the user as to the particular attitude of connector B to the chain or chains to be interengaged.

Provided for effectively closing the mouths 47,48 of openings 45,46 during usage of hook B so as to inhibit relatively movement between legs 43,44 and central leg 40, is a keeper link 55 which, in effect, comprises a pair of keeper links 55',55", each of which corresponds to keeper link 16 hereinabove but which are united or integrated into a single member. Said links 55',55" are mutually superimposed at the inner ends of their related central openings 56', 56" to provide a passage 57 for relative extension therethrough of central leg 40. Said links 55', 55" are mutually secured, as by welding, at 58, in the zone of superimposition. It will thus be seen that the outer portions of each member 55', 55" extend about the associated outer leg 43,44', respectively, and with cotter pins 53,54 engaged within apertures 51,52, respectively; said composite keeper link 55 is in locked condition.

It will thus be seen that connector hook B is uniquely constructed to provide the novel safety feature of the present invention for forces acting upon each end of said hook and for reliably resisting same.

Conventional links of associated chains may be interengaged with bight portions 41,42 through suitable manipulation of composite keeper link 55 wherein first one mouth 47 and 48 is opened and then suitably closed, and then the remaining mouth is opened and then closed.

It is apparent that if desired a pair of independent keeper links, such as 16, might be utilized, in lieu of the composite keeper link 55, but it has been found in practice that the integration of such links, as 55', 55" brings about a resisting force greater than might be obtained by use of the individual, separate keeper links.

Having described our invention, what we claim and desire to obtain by Letters Patent is:

1. A chain connector hook comprising a body having first and second spaced apart legs, said legs defining therebetween a chain-link receiving opening, said legs being continuous in one of their end portions in bight formation defining an inner limit to said opening, said first leg being bent upon itself away from said second leg, in its other end portion remote from said bight for defining an eyelet, and a keeper link having a body with an opening for receiving said first and second legs to extend transversely across said chain-link receiving opening for effecting closure of the end thereof remote from said bight, said eyelet being dimensioned for reception therein of one end portion of said keeper link.

2. A chain connector hook as defined in claim 1 and further characterized by said link being fabricated of stock of reduced cross section than that of said legs.

3. A chain connector hook as defined in claim 1 and further characterized by detachable means provided on said second leg for preventing disengagement of said keeper link from said hook.

4. A chain connector hook as defined in claim 1 and further characterized by said second leg being of less length than said first leg, said second leg having a tapered portion at its end remote from said bight to facilitate acceptance of said keeper link thereon, detachable means engageable upon said second leg proximate its tapered portion for inhibiting movement of said keeper link into disengaged relationship.

5. A chain connector hook as defined in claim 1 and further characterized by means permanently enclosing said eyelet for retention of the received end portion of said keeper link therein.

6. A chain connector hook comprising a body having a central leg and first and second outer legs in axially parallel relationship, said first and second legs being continuous with said central leg at opposite end portions thereof through an intervening bight, there being first and second openings between said central leg and said first leg, and said central leg and said second leg, respectively, each of said first and second openings being open through their end portions remote from the proximate bight, a keeper link having a body slideably disposed upon said central leg and having extensions in opposite directions with openings therein for receiving said first and second legs, and means provided on said first and second legs for preventing disengagement of the related keeper link portions therefrom.

7. A chain connector hook as defined in claim 6 and further characterized by each of said first and second legs in their end portions remote from the associated bight being tapered for facilitating engagement of the related portion of the keeper link thereon.

8. A chain connector hook as defined in claim 7 and further characterized by said means for preventing disengagement of said keeper link comprising an aperture provided in each of said first and second legs having an axis normal to the major axis of the related leg, and a fastener member engageable therein.

9. A chain connector hook as defined in claim 1 and further characterized by said first and second spaced apart legs being axially parallel.

10. A chain connector hook as defined in claim 4 and further characterized by said detachable means comprising an aperture extending through said second leg proximate its tapered portion, and a cotter pin receivable within said aperture.

* * * * *